US012209695B2

(12) United States Patent
Gauthier

(10) Patent No.: US 12,209,695 B2
(45) Date of Patent: Jan. 28, 2025

(54) VERIFICATION PULL TAB CLIP FOR QUICK CONNECTOR ASSEMBLY

(71) Applicant: A Raymond et Cie, Grenoble (FR)

(72) Inventor: Justin Gauthier, Shelby Township, MI (US)

(73) Assignee: A. RAYMOND ET CIE, Grenoble (FR)

( * ) Notice: Subject to any disclaimer, the term of this patent is extended or adjusted under 35 U.S.C. 154(b) by 521 days.

(21) Appl. No.: 17/505,818

(22) Filed: Oct. 20, 2021

(65) Prior Publication Data
US 2023/0121914 A1 Apr. 20, 2023

(51) Int. Cl.
*F16L 37/098* (2006.01)
(52) U.S. Cl.
CPC ....... *F16L 37/0982* (2013.01); *F16L 2201/10* (2013.01)
(58) Field of Classification Search
CPC . F16L 37/0885; F16L 37/0982; F16L 37/144; F16L 2201/10; F16B 21/12; F16B 21/125; Y10T 24/44026; Y10T 24/44769
See application file for complete search history.

(56) References Cited

U.S. PATENT DOCUMENTS

| | | | | |
|---|---|---|---|---|
| 5,452,184 | A * | 9/1995 | Scholder | H05K 7/12 |
| | | | | 24/297 |
| 6,295,701 | B1 * | 10/2001 | Bessho | H05K 5/0013 |
| | | | | 24/297 |
| 2004/0228678 | A1 * | 11/2004 | Kojima | F16B 5/121 |
| | | | | 403/305 |
| 2017/0363237 | A1 * | 12/2017 | Pepe | F16L 37/144 |
| 2018/0328525 | A1 * | 11/2018 | Kerin, Jr. | F02M 37/0017 |
| 2021/0285581 | A1 * | 9/2021 | Rydin | F16L 33/10 |
| 2022/0333723 | A1 * | 10/2022 | Gardner | F16L 37/144 |
| 2023/0392735 | A1 * | 12/2023 | Grujo | F16L 37/0885 |

FOREIGN PATENT DOCUMENTS

AT           512397 B1 *  8/2013    ............ F16L 37/088

OTHER PUBLICATIONS

Okuda N., Pipe Connecting Device, JP-07260073-A,Oct. 13, 1995 (Year: 1995).*

* cited by examiner

*Primary Examiner* — Zachary T Dragicevich
*Assistant Examiner* — James A Linford
(74) *Attorney, Agent, or Firm* — Warner Norcross + Judd LLP

(57) ABSTRACT

A verification pull tab clip includes a pull tab. A generally planar body extends from the pull tab and has first and second opposite sides, proximal and distal ends, and top and bottom ends. The body is elongated in a longitudinal direction that extends between the proximal and distal ends. An indication surface is disposed on the first side of the body. A cantilevered arm extends from the pull tab in the longitudinal direction and is spaced apart from the body. The arm terminates at a free end and has first and second sides. A latch is disposed at the free end of the arm. An abutment projects outwardly from the second side of the arm. The arm is deflectable away from the bottom end for securing the latch, and is deflectable away from the bottom end for releasing the latch in response to a deflection of the abutment.

9 Claims, 11 Drawing Sheets

VERIFICATION PULL TAB CLIP FOR QUICK CONNECTOR ASSEMBLY

FIELD OF THE INVENTION

The disclosure generally relates to quick connectors and, more specifically, to quick connectors providing visible indication of proper and/or complete installation during use.

BACKGROUND OF THE INVENTION

Quick connectors are connector assemblies that allow for convenient, quick, fluid-tight connections between two or more pipes, tubes, or similar components. Quick connectors are commonly used in the automotive industry to connect tubing used in engine cooling circuits or, more recently, in cooling circuits used to cool batteries of electric or hybrid vehicles. Quick connectors typically include a female connector for receiving a male connector, or a male connector for receiving a female connector. In operation, when fully disposed within the female connector, the male connector is reversibly locked in position allowing for leak-free fluid communication between a first tube in fluid communication with the female connector and a second tube in fluid communication with the male connector. Unfortunately, many conventional quick connectors suffer from numerous drawbacks associated with locking together the components to be connected, resulting in failed connections, depressurizations, and leaks.

BRIEF SUMMARY

An improved verification pull tab clip and quick connector (QC) assembly for connecting and establishing fluid communication between two components is provided. The verification pull tab clip includes a pull tab. A generally planar body extends from the pull tab and has a first side, a second side opposite the first side, a proximal end, a distal end opposite the proximal end, a top end, and a bottom end opposite the top end. The body is elongated in a longitudinal direction that extends from the proximal end to the distal end. An indication surface is disposed on the first side of the body. A cantilevered arm extends from the pull tab in the longitudinal direction and is spaced apart from the body. The arm terminates at a free end and has first and second sides corresponding to the first and second sides of the body. A latch is disposed at the free end of the arm. An abutment projects outwardly from the second side of the arm. The arm is deflectable away from the bottom end of the body for securing the latch, and the arm is deflectable away from the bottom end of the body for releasing the latch in response to a deflection of the abutment.

In specific embodiments, the verification pull tab clip includes an angled deflection surface at the free end of the arm adjacent the latch. Engagement of the deflection surface deflects the arm away from the bottom end of the body.

In specific embodiments, the verification pull tab clip includes an orientation rib disposed on the second side of the body and extending in the longitudinal direction.

In specific embodiments, the cantilevered arm is angled relative to the bottom end of the body.

In particular embodiments, a connector assembly for connecting and establishing fluid communication between two components includes the verification pull tab clip. The connector assembly includes a main housing defining a fluid passageway extending along a first axis at an open first end and to an open second end. A clip housing is connected to the main housing and is disposed outside of the fluid passageway. The clip housing includes a port that receives the verification pull tab clip therein. The main housing and the clip housing cooperatively include a vertical slot that is open to the fluid passageway and the port. A catch is disposed within the port. The catch cooperates with the latch to fasten the verification pull tab clip in the port, and the abutment of the clip is positioned within the slot. The verification pull tab clip is adapted for being slideably displaced along the port between a locked, negative verification position where the indication surface is completely disposed within the clip housing and an unlocked, positive verification position where the verification pull tab clip is removable from the port to reveal the indication surface.

In certain embodiments, the indication surface of the verification pull tab clip is concealed within the clip housing when the clip is fastened in the port.

In certain embodiments, the port includes a longitudinal slot therein that is perpendicular to the first axis of the main housing. The orientation rib of the verification pull tab clip is received in the slot.

In certain embodiments, a first component is inserted into the open first end of the main housing. The first component includes a first axis that is aligned with the first axis of the main housing when inserted into the main housing. The first component also includes a linear projection extending in a direction of the first axis. The linear projection is received in the slot of the main and clip housings and includes a deflection surface that engages the abutment of the verification pull tab clip when the first component is fully inserted into the main housing to deflect the arm and allow for release of the verification pull tab clip from the clip housing.

In specific embodiments, the main housing, the clip housing, and/or the verification pull tab clip is independently monolithic in construction.

A method for connecting and establishing fluid communication between two components with the QC assembly is also provided. The method includes slideably displacing the pull tab clip along the port and into the positive verification position by inserting an end of the first component into the open first end of the main housing until the linear projection of the first component is received in the slot of the main and clip housings and the deflection surface engages the abutment of the pull tab clip to deflect the arm and allow for release of the pull tab clip from the clip housing. The method may further include coupling an end of a second component to the open second end of the main housing of the connector assembly.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
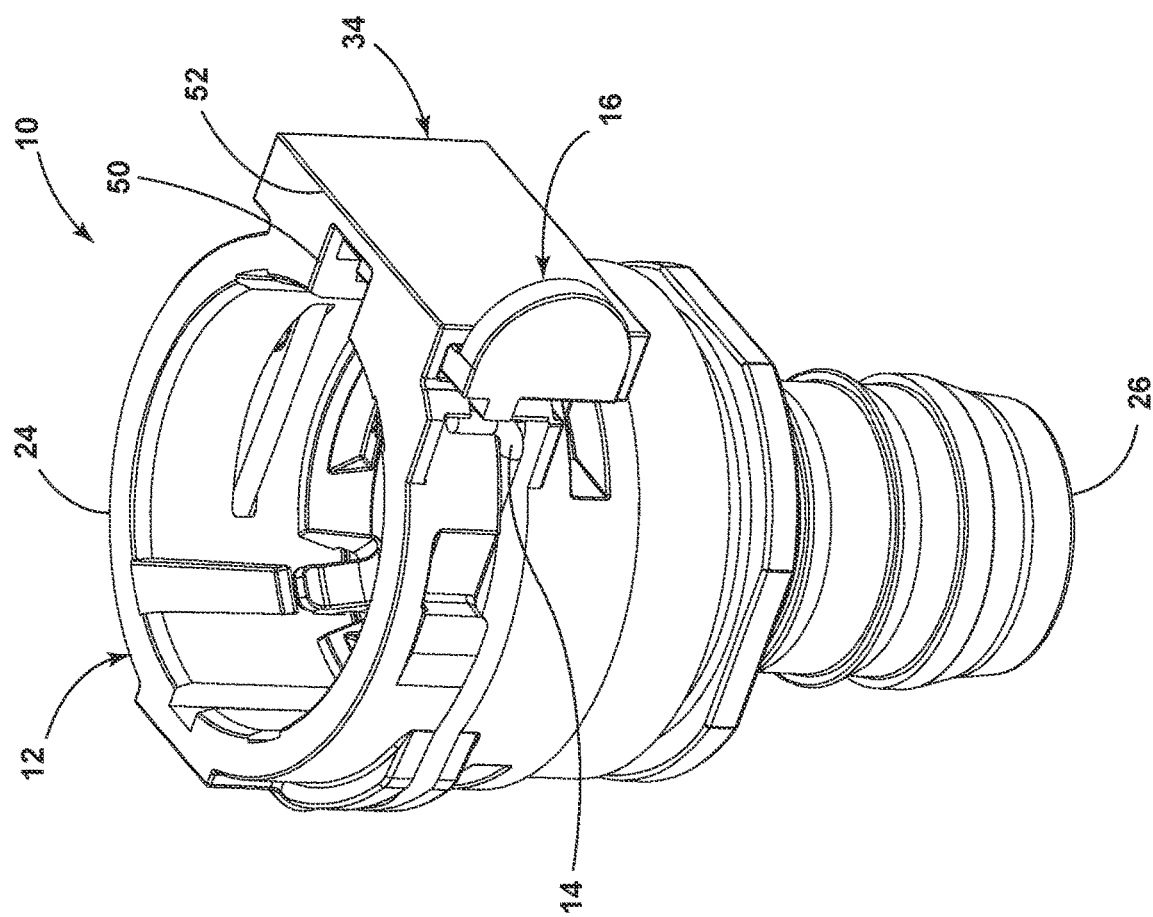
FIG. 1 shows a perspective view of a quick connector (QC) assembly in accordance with some embodiments of the disclosure.

A quick connector assembly is provided. Referring to FIGS. 1-11, wherein like numerals indicate corresponding parts throughout the several views, the quick connector assembly (also referred to as the connector assembly, or QC assembly herein) is illustrated and generally designated at 10. Certain features of the quick connector assembly 10 are functional, but can be implemented in different aesthetic configurations. The quick connector assembly 10 includes a main (coupling) housing 12, a retainer clip 14, a verification pull tab clip 16, and a clip housing 34.

The main housing 12 comprises an exterior surface 18 and an interior surface 20 that generally defines a fluid passageway 22 (i.e., an open bore 22, alternatively referred to as the passageway 22). In particular, the main housing 12 comprises open first and second ends 24, 26, with the fluid passageway 22 extending therebetween. In various embodiments, the open first end 24 of the main housing 12 is adapted as a female coupling end 24 (e.g. to cooperatively engage a male end of a component, as shown generally at 28 and described below as the male connector 28. In some such embodiments, the open second end 26 of the main housing 12 is adapted as a male coupling end 26 (e.g. to cooperatively engage a female end of a component (not shown)). As such, the open first and second ends 24, 26 may be referred to herein as the female coupling end 24 and the male coupling end 26, respectively. In some embodiments, while not shown, the quick connector assembly 10 includes a plurality of female coupling ends 24 and/or a plurality of male coupling ends 26.

In general, the fluid passageway 22 fluidly connects the female coupling end 24 to the male coupling end 26 and the fluid passageway allows fluid to exit or enter from the main housing 12 through the female coupling end 24 and the male coupling end 26. In particular, the fluid passageway 22 extends along a first axis $A_1$ (alternatively referred to as the coupling axis $A_1$) at the female coupling end 24 and along a second axis $A_2$ at the male coupling end 26. The first and second axes $A_1$, $A_2$ may be collinear, parallel, perpendicular, etc. with respect to each other. As such, the main housing 12 itself may conform to a variety of sizes, shapes or configurations, and may be I-shaped, U-shaped, L-shaped, T-shaped, or the like.

In various embodiments, the passageway 22 is cylindrical in cross-section or oval or square in cross-section. In some embodiments, the coupling axis $A_1$ forms an angle with the second axis $A_2$. In specific embodiments, the angle is equal to 0°, 45°, or 90°. In particular embodiments, the fluid passageway 22 includes a minimum diameter equal to from 4 to 70 mm, alternatively from 8 to 50 mm.

In certain embodiments, the female coupling end 24 of the main housing 12 defines a first retainer-clip slot 30. The first retainer-clip slot 30 is generally disposed perpendicular to the coupling axis $A_1$. As described further below, the first retainer-clip slot 30 allows the retainer clip 14 to establish lockable engagement with the male connector 28 (i.e., a male end of a component, as introduced above) disposed within the quick connector assembly 10. In certain embodiments, the female coupling end 24 further defines a second retainer-clip slot 32. In particular embodiments, the second retainer-clip slot 32 is defined by the main housing 12 at positions radially opposed to the first retainer-clip slot 30 with respect to the coupling axis $A_1$.

Figure 2:
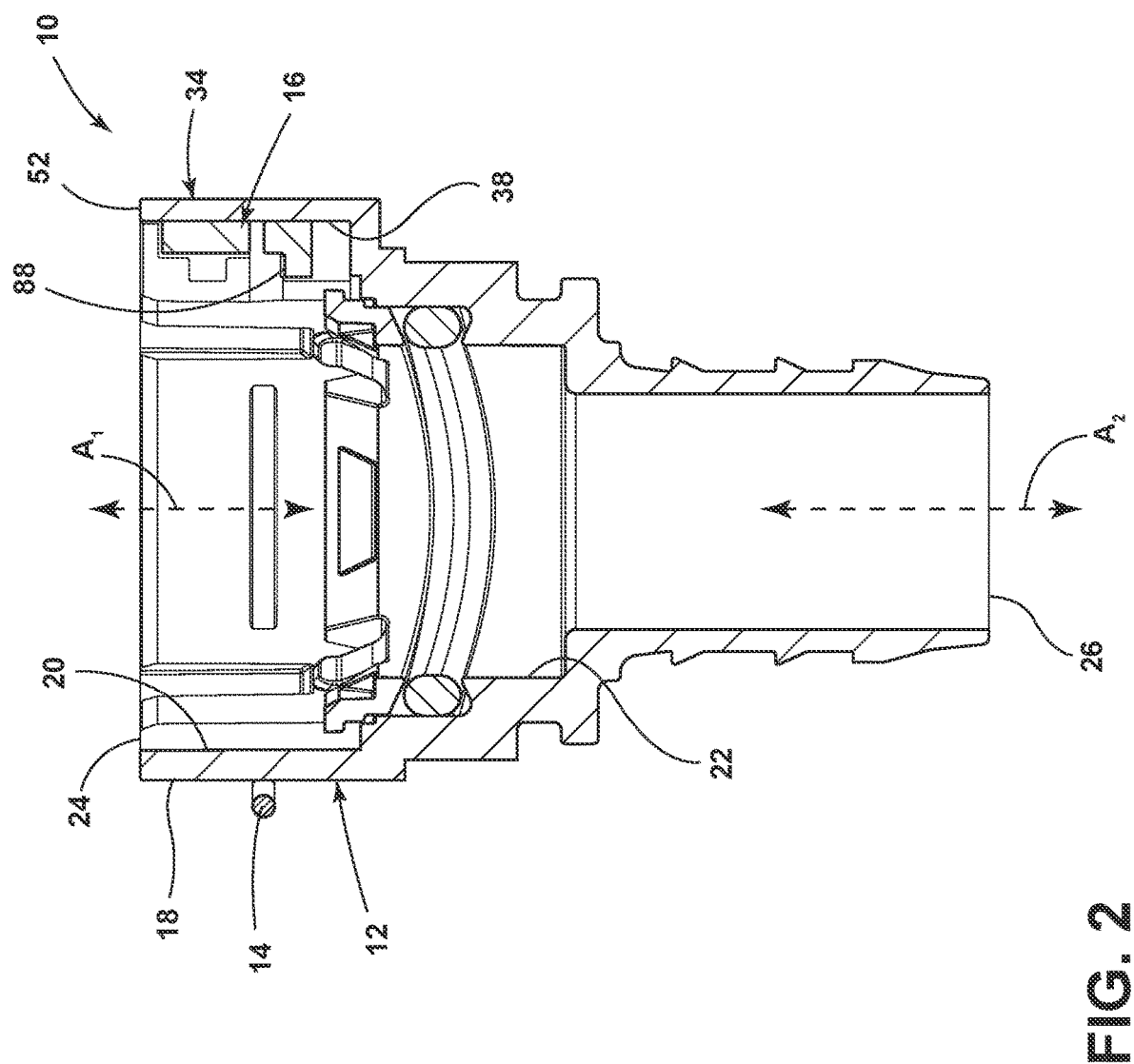
FIG. 2 shows a side cross-sectional view of the QC assembly of FIG. 1.
Figure 3:
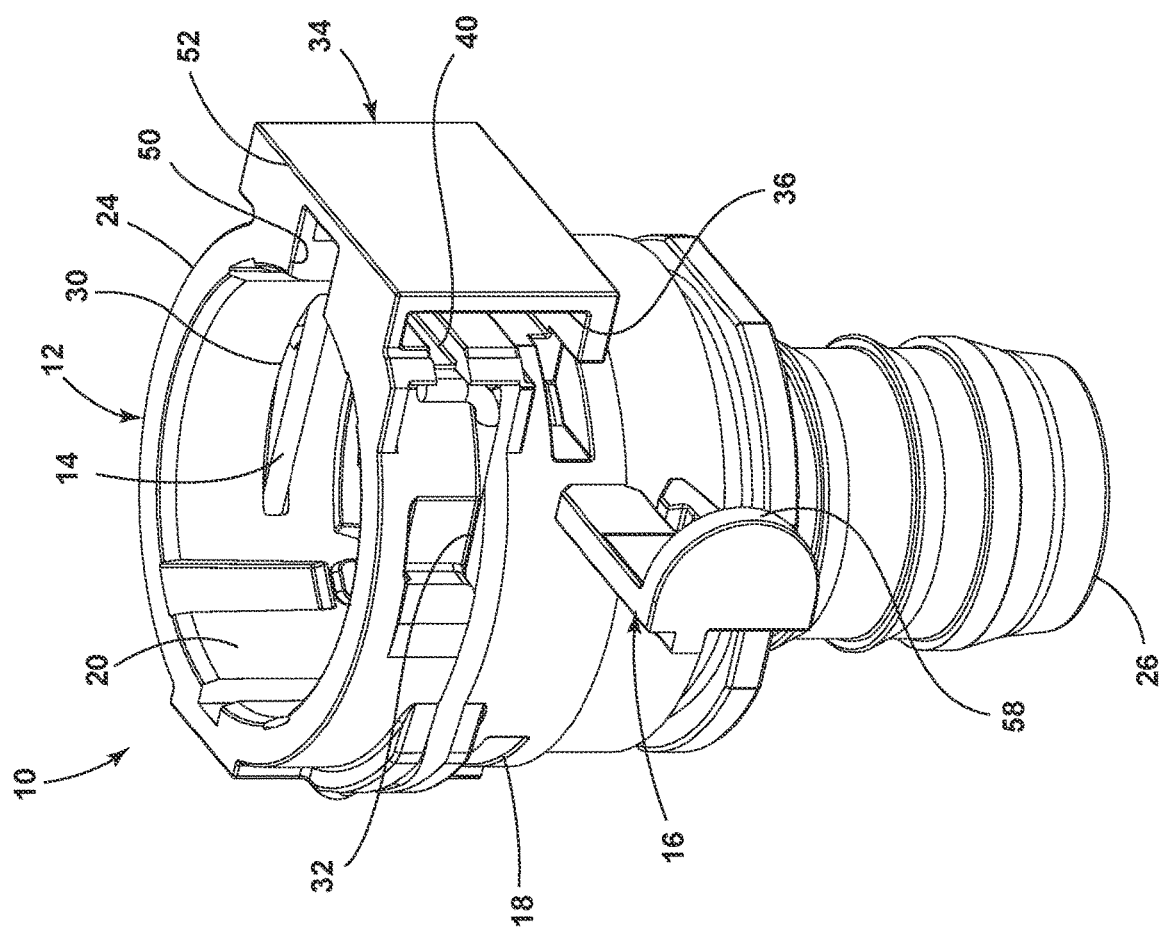
FIG. 3 shows a perspective view of the QC assembly with a verification pull tab clip in a positive verification position.

The retainer clip 14 is not limited, and may be a separate component or integral with another component of the QC assembly 10, such as the main housing 12. In some embodiments, the retainer clip 14 is a generally C-shaped or D-shaped spring. In some embodiments, as shown in FIGS. 1-3, the retainer clip 14 is generally received within the first retainer-clip slot 30 and the second retainer-clip slot 32. The retainer clip 14 may be secured around the exterior surface 18 of the main housing 12 in a locked configuration, as shown in FIGS. 1-3, or in an unlocked configuration (not shown). In the unlocked configuration, the retainer clip 14 is in physical contact with the exterior surface 18 and the retainer clip 14 and not generally disposed within the first retainer-clip slot 30 or the second retainer-clip slot 32.

The clip housing 34 is connected to the exterior surface 18 of the main housing 12 and is disposed outside of the fluid passageway 22. The clip housing 34 may be integral with the main housing 12. The clip housing 34 has a port 36 that receives the pull tab clip 16 as described in more detail below. The interior space of the port is defined at least in part by an interior surface 38 of the clip housing 34. The interior surface 38 of the clip housing includes a guide rail formed of a groove or longitudinal slot 40 that is generally perpendicular to the first axis $A_1$ of the main housing. The interior surface 38 also includes a catch 42. The catch 42 includes at least a locking surface 44, an angled slide surface 46 adjacent the locking surface, and a stop surface 48 adjacent the slide surface. The main housing 12 and the clip housing 34 cooperatively include a vertical slot 50 that is open to both the fluid passageway 22 and the port 36, and that extends in a direction that is generally parallel to the first axis $A_1$. Particularly, the slot 50 is defined in part by an opening in the interior surface 20 of the main housing 12 and an opening in an outer (upper) surface 52 of the clip housing 34, and the slot is open to the interior of the clip housing 34. The male (first) component 28 includes a linear projection 54 that extends linearly in the direction of the first axis $A_1$. The linear projection 54 may be, for example, a prismatic shape such as a rectangular-like solid having an overall length that is greater than its width and height, and the linear projection is raised from and projects outwardly from the outer surface of the male component 28 in a radial direction. The linear projection 54 is received in the vertical slot 50 when the male (first) component 28 is inserted into the female coupling end 24 of the connector assembly. The linear projection also includes a deflection surface 56 at an inner end that will be described in more detail below.

As introduced above, the connector assembly 10 includes the verification pull tab clip 16. In general, the pull tab clip 16 is disposed within the port 36 of the clip housing 34, and is adapted for being slideably displaced along the port 36 between a locked, negative verification position (as shown in FIG. 1) and an unlocked, positive verification position (as shown in FIG. 3). More specifically, in the negative verification position the pull tab clip 16 is completely disposed within the clip housing 34 and not readily visible to a user, whereas in the positive verification position the pull tab clip 16 is unlocked and slideably removable from the port and readily visible to a user. An exemplary verification pull tab clip 16, as utilized in certain embodiments of the connector assembly 10, is shown in FIGS. 4, 5, 7, 8, and 11.

Figure 4:
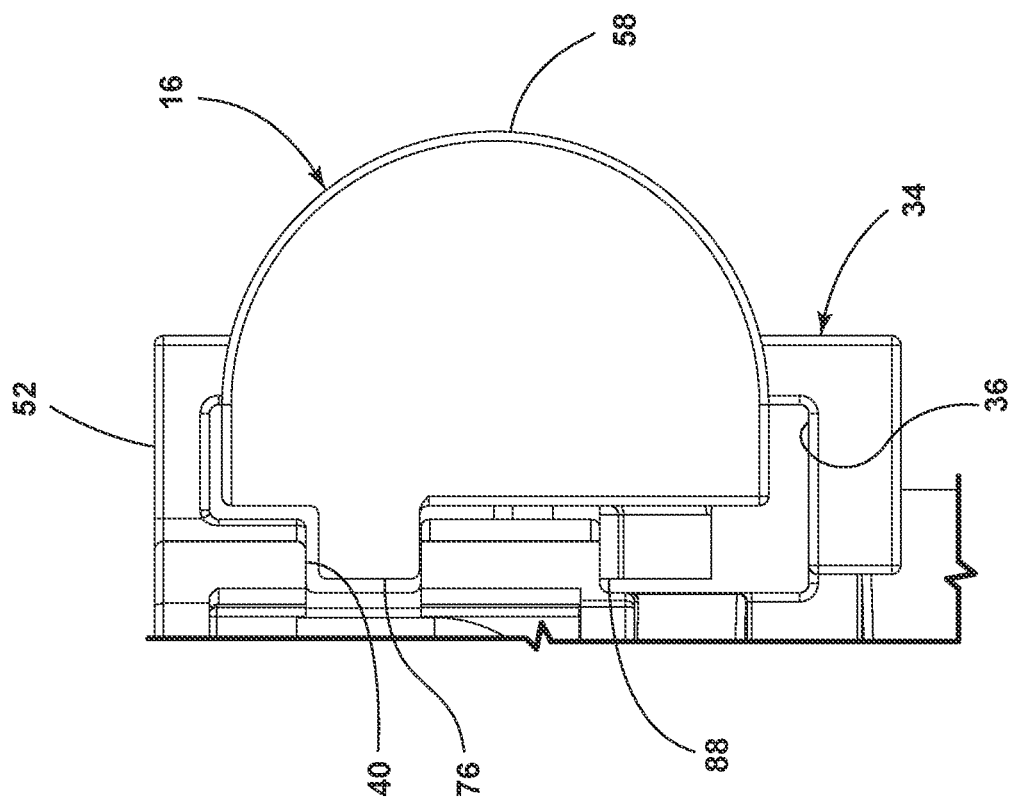
FIG. 4 shows a front view of the verification pull tab clip in a clip housing of the QC assembly.
Figure 5:
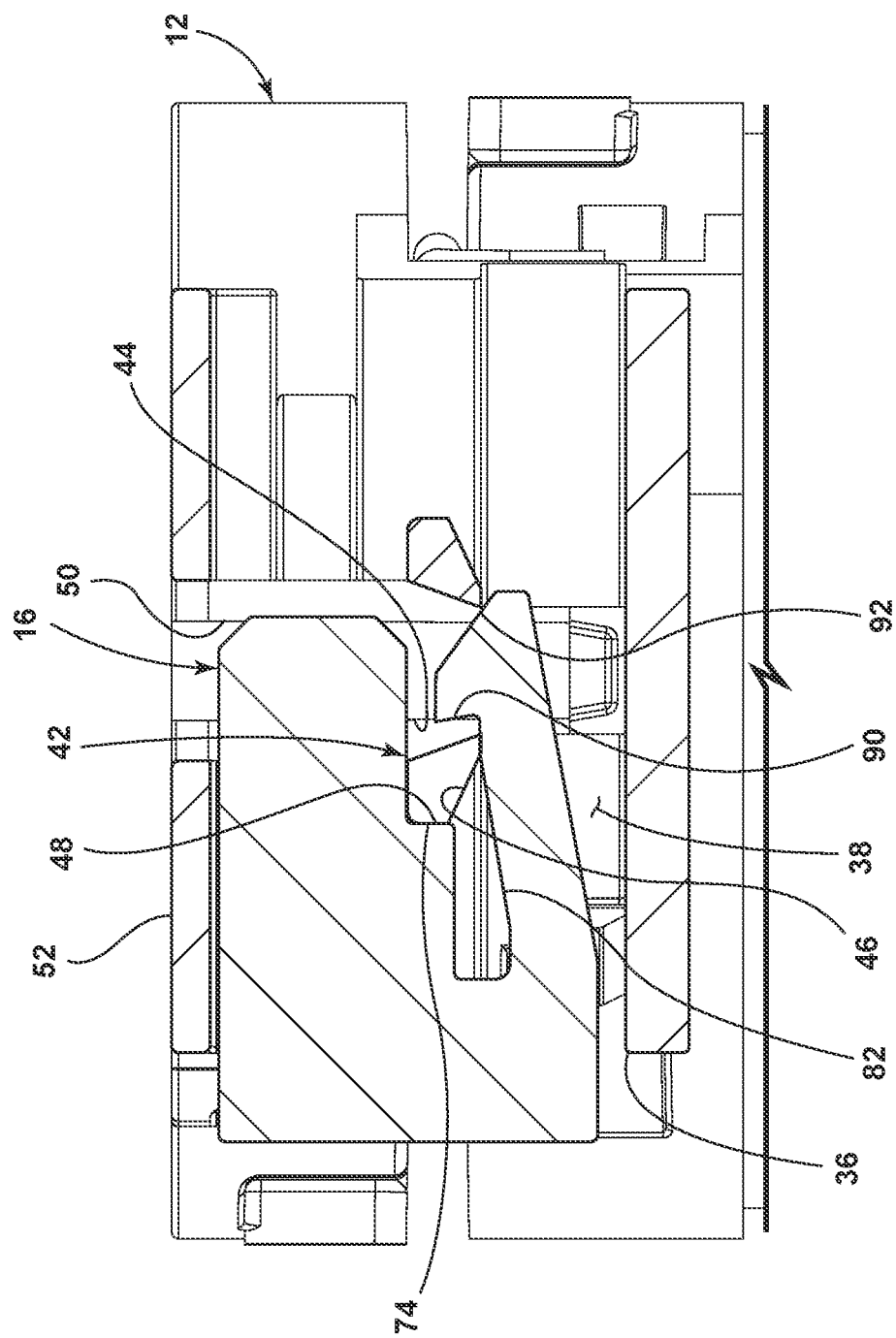
FIG. 5 shows a side cross-sectional view of the verification pull tab clip in a locked, negative verification position in the clip housing.
Figure 6:
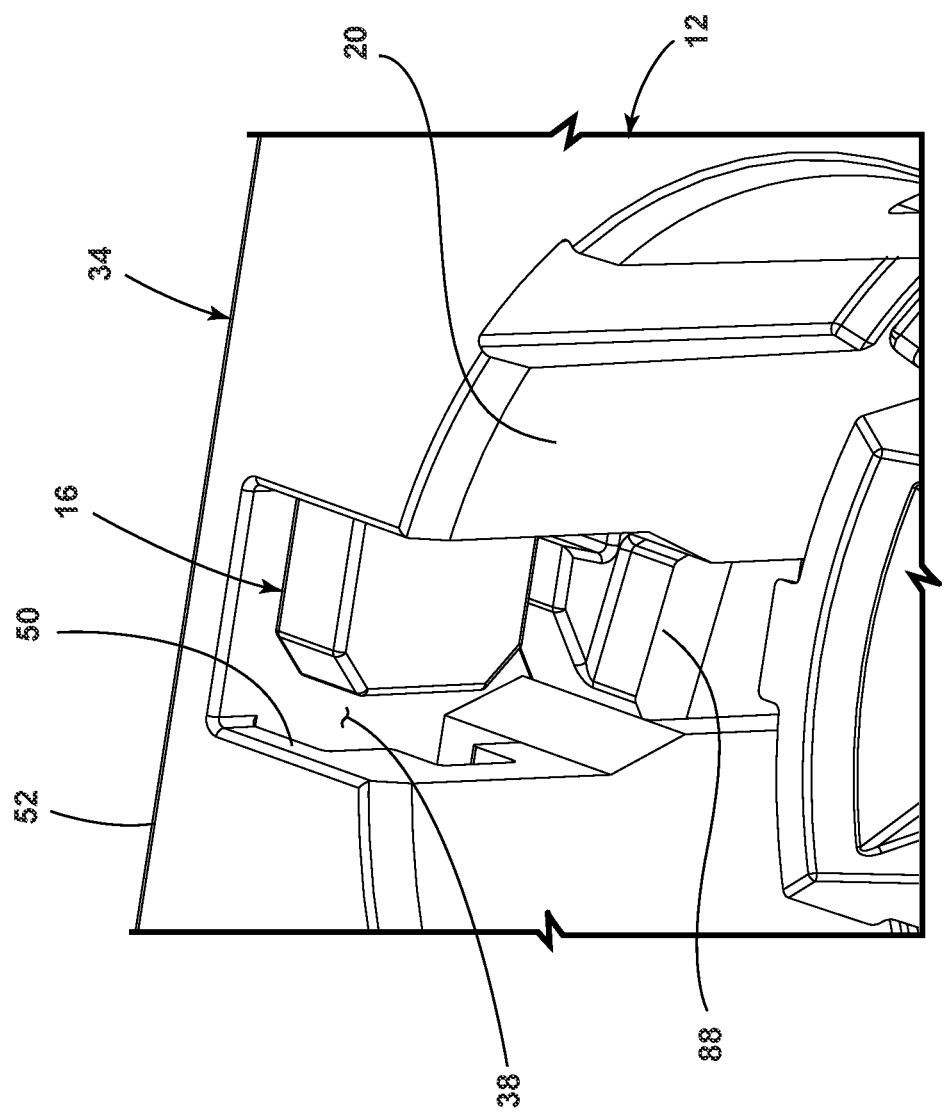
FIG. 6 shows a partial perspective view of the QC assembly.
Figure 7:
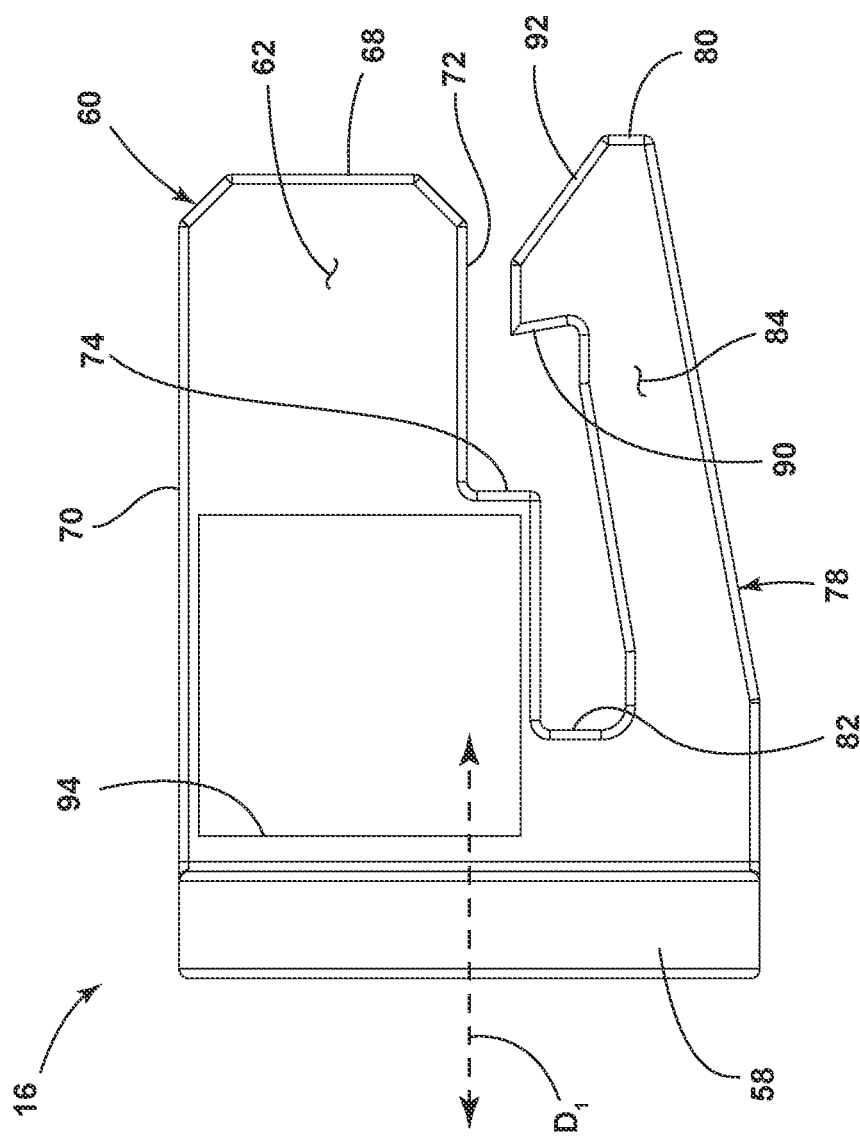
FIG. 7 shows a side view of the verification pull tab clip.
Figure 8:
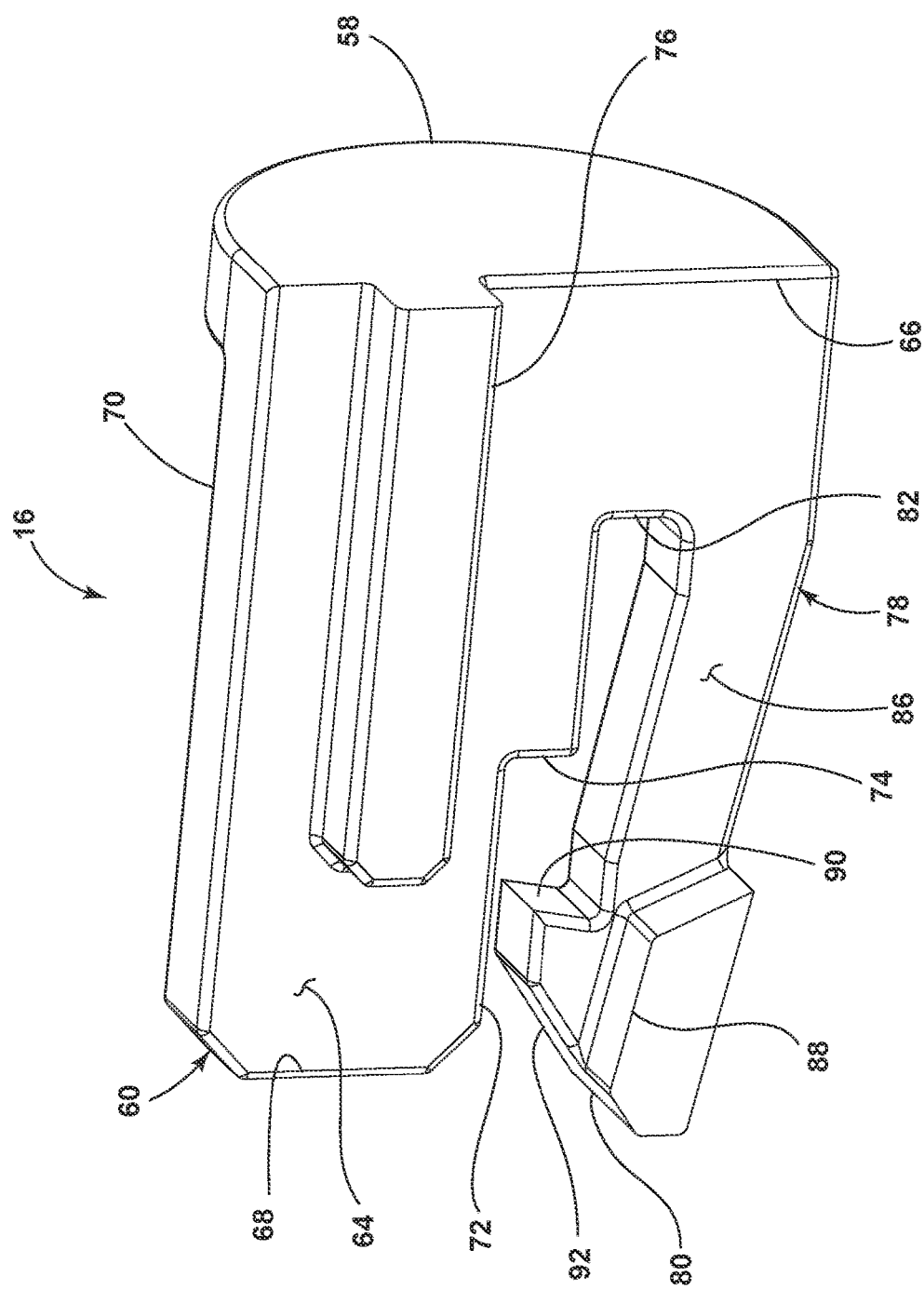
FIG. 8 shows a side perspective view of the verification pull tab clip of FIG. 7.
Figure 9:
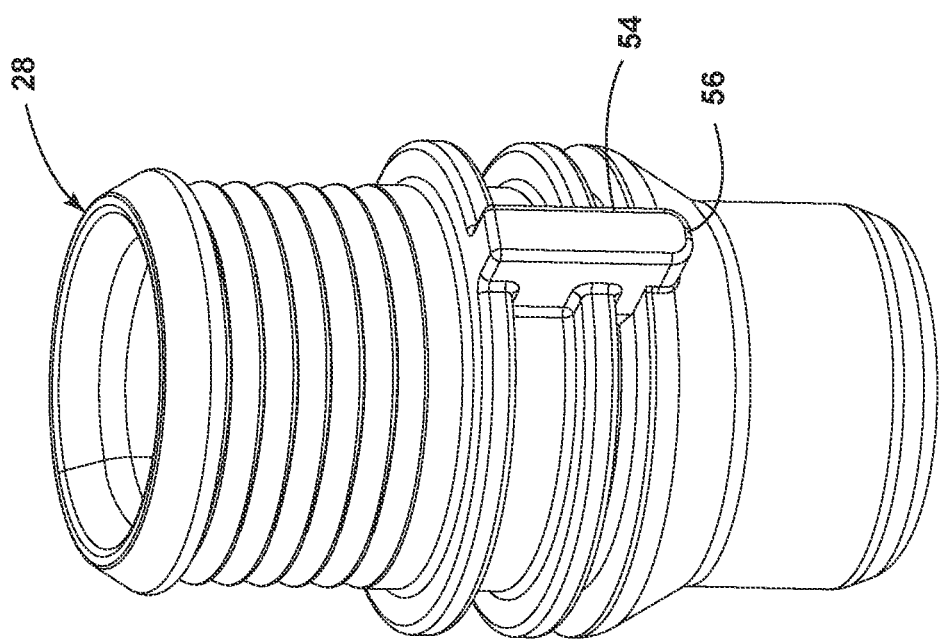
FIG. 9 shows a perspective view of a male connector of the QC in accordance with particular embodiments of the disclosure.

The verification pull tab clip 16 includes a pull tab 58. As shown in FIGS. 4 and 8, the pull tab may have a semi-circular, half-moon shape, although the pull tab is not limited to any particular shape, and may have a regular or irregular polygonal shape such as a triangle, square, rectangle, and the like. The pull tab 58 is a gripping element that may be gripped by a thumb and finger of a human operator to manipulate the clip 16 as described in more detail below. The surface(s) of the pull tab 58 may or may not be textured, contoured, and the like to increase friction and reduce slipping.

A generally planar body 60 extends from the pull tab 58. The body 60 has a first side 62, a second side 64 opposite the first side, a proximal end 66, a distal end 68 opposite the proximal end, a top end 70, and a bottom end 72 opposite the top end. The body 60 is elongated in a longitudinal direction $D_1$ that extends generally horizontally from the proximal end 66 to the distal end 68. The body 60 is generally thin and rectangular in shape, having a length and width much greater than the thickness. A stop 74 is disposed on the bottom end 72 of the body intermediate the proximal and distal ends 66, 68. The stop 74 may be a step along the bottom end of the body that interacts with the stop surface 48 of the catch 42 in the clip housing 12 to limit movement of the clip 16 in the port 36, as described in more detail below. The pull tab 58 is joined to the proximal end 66 of the body 60 and may project outwardly from the first side 62 of the body. As shown by example, the pull tab 58 may be generally perpendicular to the first side of the body. However, the pull tab may extend at any angle from the surface of the first side, and even may be parallel to the first side, thereby effectively extending from the proximal end of the body. An orientation rib 76 may be formed on the second side 64 of the body. The orientation rib 76 generally extends in the longitudinal direction $D_1$ and orients and guides the sliding movement of the clip 16.

A cantilevered arm 78 extends from the pull tab 58 generally in the longitudinal direction $D_1$ and terminates at a free end 80. The arm 78 is spaced apart from the body 60 and is disposed below the bottom end 72 of the body. The arm 78 is angled relative to the bottom end 72, and a slot 82 is formed in the space between the bottom end and the arm. The arm 78 has a first side 84 and a second side 86 corresponding to the first and second sides 62, 64 of the body 60. The first side 62 may be free of any surface features, while an abutment 88 projects outwardly from the second side 86. A latch 90 is disposed at the free end 80 of the arm 78. The latch 90 may be in the form of a hook or similar that can engage a cooperating surface to lock the clip 16 in place. An angled deflection surface 92 is also disposed at the free end 80 of the arm adjacent the latch 90. The deflection surface 92 contacts the slide surface 46 of the catch 42 in the port 36 to deflect the arm away from the bottom end 72 of the body 60, thereby moving the position of the latch 90.

The body 60 and the cantilevered arm 78 may generally lie in the same plane defined by their corresponding first and second sides 62, 64, 84, 86. The free end 80 of the arm is deflectable away from the body 60, thereby moving the latch 90 away from the bottom end 72 of the body and increasing the width of the slot 82. The arm flexes near its fixed end that is connected to the pull tab 58.

The pull tab clip 16 can be inserted into the port 36 of the clip housing 34. Particularly, the distal end 68 of the body and free end 80 of the arm are first inserted into the port 36 by aligning the orientation rib 76 of the body with the longitudinal slot 40 in the clip housing 34. Insertion of the orientation rib 76 into the slot 40 ensures correct positioning of the pull tab clip 16 in the port 36 so that the latch 90 is properly aligned with the catch 42. As the pull tab clip is slid deeper into the clip housing, the deflection surface 92 at the free end of the arm contacts and is engaged by the slide surface 46 of the catch 42. Engagement of the deflection surface 92 with the slide surface 46 deflects the arm 78 away from the body 60 of the clip, widening the slot 82 and allowing the catch to be received in the slot. As the deflection surface 92 and latch 90 move past the slide surface 46, the resiliency of the arm 78 causes the arm to snap back towards its resting state, thereby engaging the latch 90 with the locking surface 44 of the catch 42 to secure the clip in a locked, negative verification position in the clip housing. When the latch 90 is engaged with the catch 42, the stop 74 on the clip body 60 is engaged with the stop surface 48 on the catch to squeeze the catch between the latch and the stop, limiting additional inner movement of the clip 16 into the port 36 of the clip housing 34. In the locked position, the pull tab 58 of the clip 16 remains outside of the port, and the clip cannot be removed from the clip housing 34, even if a human operator grips and pulls the pull tab.

Figure 10:
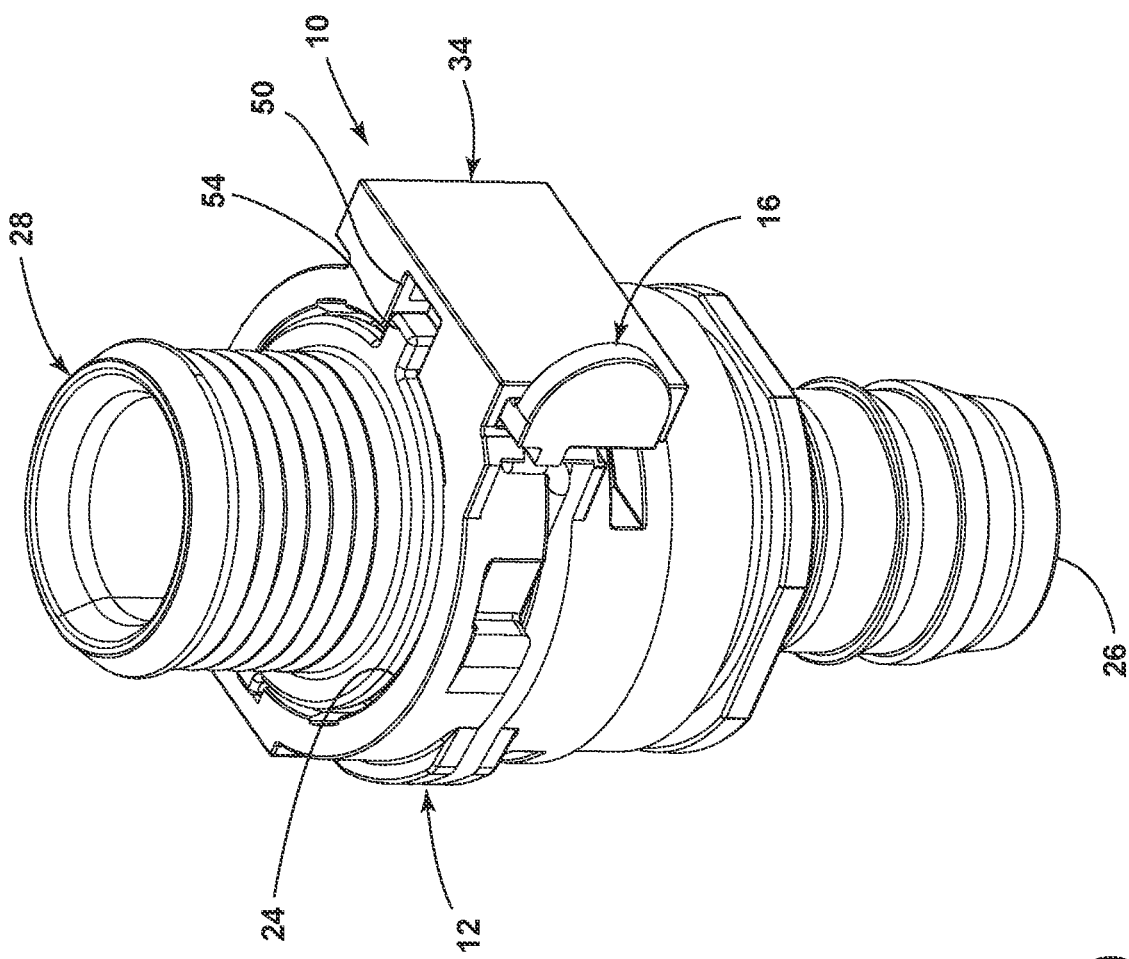
FIG. 10 shows a perspective view of the QC assembly having the verification pull tab clip unlocked from the clip housing by the male connector.
Figure 11:
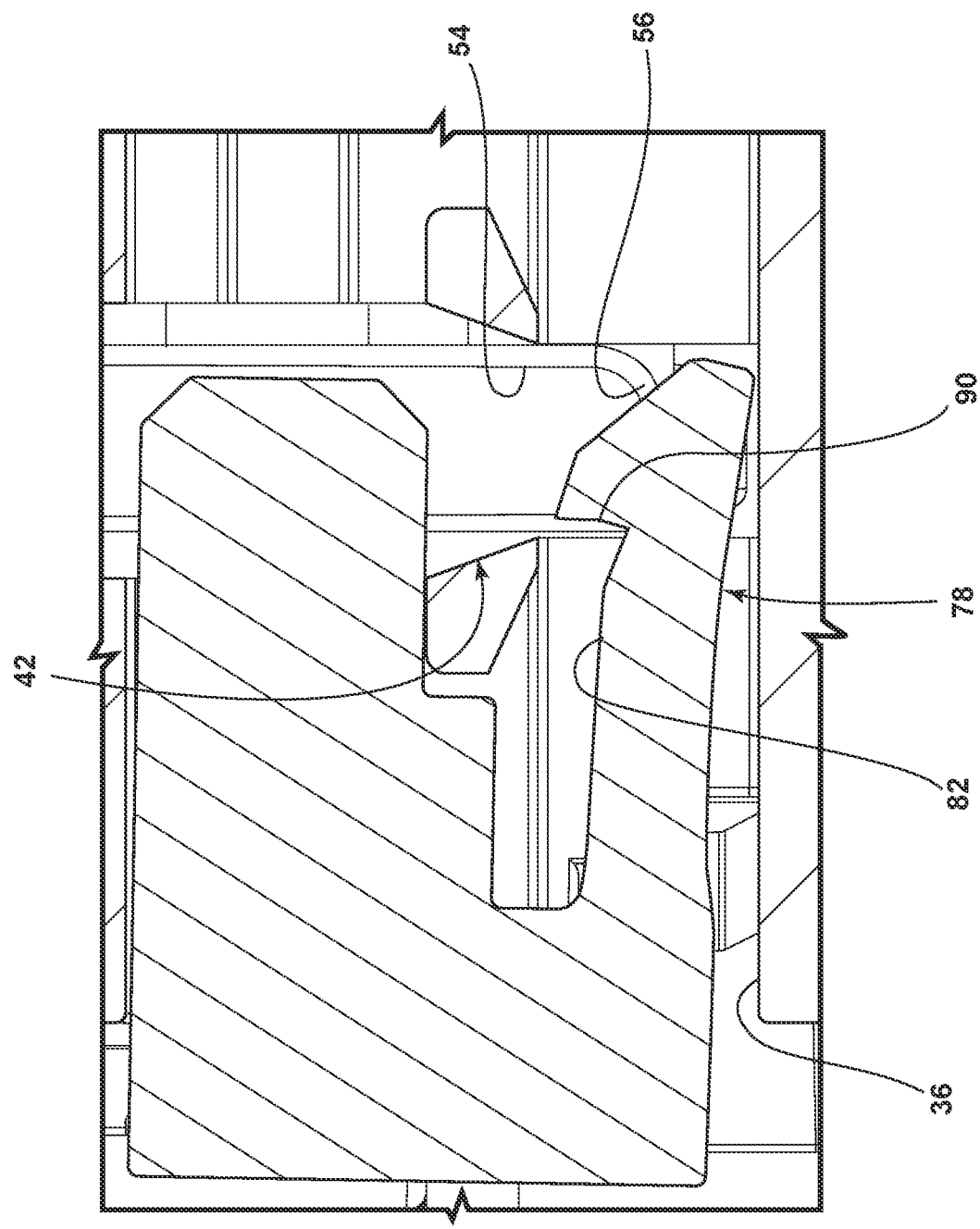
FIG. 11 shows a partial cross-sectional view of the QC assembly of FIG. 10 assembly having the verification pull tab clip unlocked by the male connector and moveable to the positive verification position.

When a male (first) component 28 is inserted into the female coupling end 24 of the connector assembly 10 as shown in FIG. 10, the linear projection 54 on the outside of the male component must be aligned with and moved into the vertical slot 50 in the main and clip housings 12, 34. Otherwise, the male component cannot be fully inserted into the female coupling end. When the male component is fully inserted into the female coupling end, the deflection surface 56 of the linear projection 54 engages the abutment 88 on the arm 78 of the pull tab clip 16, which deflects the arm in a downward direction away from bottom end 72 of the clip body and widens the slot 82. Consequently, the latch 90 is disengaged from the catch 42, unlocking the pull tab clip and allowing for release of the pull tab clip from the port 36 of the clip housing 34, such as by a user pulling the pull tab 58 outwardly away from the port. Therefore, the pull tab clip 16 can only be released from the clip housing if the male component is fully and properly engaged with the female coupling end, thus providing a degree of quality control assurance. Slideable displacement of the pull tab clip 16 along and out of the port 36 moves the pull tab clip into the positive verification position as shown in FIG. 3.

The body further includes an indication surface 94 on the first side 62. The indication surface 94 may be any of various colors including yellow, green, red, white, blue, black, orange, purple, or any of various other colors including various hues obtained through mixing of various pigments or dyes corresponding to such colors or any of various other colors known in the art. The indication surface 94 may include reflective tape disposed thereupon or a sticker or a printing displaying a pattern, color, a bar code, reflective material, or alphanumeric label or message. In some embodiments, the indication surface 94 functions to enhance the visibility of the pull tab clip 16 when the pull tab clip is in the positive verification position. In certain embodiments, the pull tab clip 16 is the same color as the indication surface 94 or the pull tab clip 16 is a different color than the indication surface 94. In particular embodiments, the indication surface 94 is so colored as to be conspicuously visible against the exterior surface 18 of the main housing 12. In various embodiments, the indication surface 94 is of a different color than the clip body 60.

In some embodiments, the indication surface 94 includes a code, such as a one-dimensional barcode (e.g. UPC code, EAN code, code 39, code 128, ITF, code 93, codabar, GS1 databar, MSI Plessey, etc.), a two-dimensional barcode (e.g. QR code, datamatrix code, PDF417, AZTEC, etc.), a holographic code, a human-readable alpha-numeric code, other codes known in the art and interpretable by machine and/or human. Additional examples of such codes include linear bar codes such as those known or otherwise characterized as Australia Post barcode, Codabar, Code 25-Non-interleaved 2 of 5, Code 25 Interleaved 2 of 5, Code 11, Farmacode (i.e., Code 32), Code 39, Code 49, Code 93, Code 128, CPC binary, EAN 2, EAN 5, EAN-8, EAN-13, GS1-128, GS1 DataBar, ITF-14, JAN, Japan Post bardcode, KarTrak ACI, MSI, Pharmacode, PLANET, Plessey, PostBar, POSTNET, RM4SCC/KIX, RM Mailmark L, Telepen, or Universal Product Code, matrix bar codes such as those known or otherwise characterized as AR code, Aztec Code, BEEtag, Bee Tagg, Bokode, Code 1, Code 16K, ColorCode, Color Construct Code, Cronto Visual Cryptogram, CyberCode, d-touch, DataGlyphs, Data Matrix, Datastrip Code, Digimarc Barcode, DotCode, DotCode A, DWCode, EZcode, Han Xin Barcode, High Capacity Color Barcode, HueCode, InterCode, JAB-Code, MaxiCode, mCode, MMCC, NexCode, PDF417, Qode, QR code, ShotCode, Snowflake Code, SPARQCode, or Trillcode, and the like, or any combination thereof.

Thus, in the locked, negative verification position, the indication surface 94 of the pull tab clip 16 is completely disposed within the clip housing 34, concealing the indication surface. The indication surface 94 is not visible until the pull tab clip 16 is unlocked from the clip housing 34 as described above, and slid out of the port 36. The indication surface 94 is hence only visible if the main housing 12 and the first component 28 of the connector assembly 10 are properly and completely connected. The pull tab clip 16 therefore has the advantage of providing a visible signal as to when the male (first) connector 28 has been fully and properly inserted within the quick connector assembly 10. Once the indication surface 94 is visible, the color, indicia, machine-readable code, etc. on the indication surface may be read by a human operator, a code reader, or the like to verify the correct connection of the assembly. For example, the indication surface 94 may be read by a scanning device to verify and document proper installation of the male connector 28 within the quick connector assembly 10. The pull tab clip 16 thereby provides confirmation that a connection has been made between the male connector 28 and the main housing 12.

The method includes ensuring that the male component 28 is fully inserted into the female coupling end 24 of the connector assembly 10. Full insertion of the male component 28 generally includes the retainer clip 14 snapping into a locked engagement with the male component 28 when the male component is properly and fully inserted within the quick connector assembly 10. In the locked configuration, the retainer clip 14 engages with an annular space defined by the male component 28 preventing withdrawal of the male component from the quick connector assembly 10. It will be understood from the above that, following full insertion of the male component 28 into the female coupling end 24, the pull tab clip 16 can be displaced into the positive verification position. When the male component 28 is fully inserted within the quick connector assembly 10, a fluid-tight seal is established between the male component 28 and the main housing 12. The method also includes coupling an end of a second component to the open second end 26 of the main housing 12 of the connector assembly 10.

Removing the male component 28 from the quick connector assembly 10 includes moving the retainer clip 14 to the unlocked configuration such that the retainer clip no longer is in a locked engagement with the male component 28. Removing the male component 28 further includes withdrawing the male component 28 from the female coupling end 24 of the quick connector assembly 10.

The various elements of the components of the quick connector assembly 10 described above, e.g. the main housing 12, the clip housing 34, the pull tab clip 16, and the retainer clip 14, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the quick connector assembly 10 (e.g. the main housing 12, the clip housing 34, the retainer clip 14, the pull tab clip 16, etc.) is monolithic in construction.

In general, materials suitable for use in or as the main housing 12, the clip housing 34, the pull tab clip 16, and the retainer clip 14 include metals (e.g. steels, aluminums, alloys, etc.), resins (e.g. thermoset and/or thermoplastic resins), rubbers/elastomers, and combinations thereof. However, myriad materials may be used to manufacture the elements of the quick connector assembly 10, each typically selected as a function of availability, cost, performance/end use applications, etc. Moreover, metals, metal alloys, rubbers/elastomers, and resins are not exhaustive of suitable materials that may be used. In general, the retainer clip 14 comprises a metal, such as a steel. However, the retainer clip 14 may comprise any number of materials suitable for providing the retainer clip with deformable resiliency.

In certain embodiments, the quick connector assembly 10 comprises a resin, such as a thermoplastic and/or thermoset resin. In such embodiments, the main housing 12, the clip housing 34, the pull tab clip 16, and/or the retainer clip 14 may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the quick connector assembly 10 comprise material suitable for use under continuous exposure to temperatures of from −40° C. to 120° C., or from −40° C. to 135° C. and/or pressures of from 0.5 to 2 bar. In certain embodiments, one or more, alternatively all, of the various components of the quick connector assembly 10 comprises materials that can withstand up to 30 minutes, alternatively more than 30 minutes, of exposure to temperatures of up to 150° C. without irreversible harmful effects (e.g. melting, etc.). In some embodiments, the main housing 12 comprises a synthetic or natural rubber or polyamide.

With regard to composition of the particular components of the quick connector assembly 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PBT), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the particular components of the quick connector assembly 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the quick connector assembly 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the quick connector assembly 10 comprises a fiberglass.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:
1. A connector assembly for connecting and establishing fluid communication between two components, the connector assembly comprising:
  a main housing defining a fluid passageway extending along a first axis at an open first end and to an open second end;
  a clip housing connected to the main housing and disposed outside of the fluid passageway;

the clip housing including a port that receives a verification pull tab clip therein, the verification pull tab clip comprising:
  a pull tab;
  a generally planar body extending from the pull tab and having a first side, a second side opposite the first side, a proximal end, a distal end opposite the proximal end, a top end, and a bottom end opposite the top end, the body being elongated in a longitudinal direction that extends from the proximal end to the distal end;
  an indication surface disposed on the first side of the body;
  a cantilevered arm extending from the pull tab in the longitudinal direction and being spaced apart from the body, the arm terminating at a free end and having first and second sides corresponding to the first and second sides of the body;
  a latch disposed at the free end of the arm; and
  an abutment projecting outwardly from the second side of the arm;
  wherein the arm is deflectable away from the bottom end of the body for securing the latch, and the arm is deflectable away from the bottom end of the body for releasing the latch in response to a deflection of the abutment;
the main housing and the clip housing cooperatively including a vertical slot that is open to the fluid passageway and the port;
a catch within the port, the catch cooperating with the latch to fasten the verification pull tab clip in the port, and the abutment of the clip being positioned within the slot,
wherein the verification pull tab clip is adapted for being slideably displaced along the port between a locked, negative verification position where the indication surface is completely disposed within the clip housing and an unlocked, positive verification position where the verification pull tab clip is removable from the port to reveal the indication surface.

2. The connector assembly of claim 1, wherein the indication surface of the verification pull tab clip is concealed within the clip housing when the verification pull tab clip is fastened in the port.

3. The connector assembly of claim 1, wherein the port includes a longitudinal slot therein that is perpendicular to the first axis of the main housing, and the verification pull tab clip includes an orientation rib disposed on the second side of the body and extending in the longitudinal direction of the body, the slot in the port receiving the orientation rib of the verification pull tab clip.

4. The connector assembly of claim 1, further including:
a first component inserted into the open first end of the main housing, the first component including a first axis that is aligned with the first axis of the main housing when inserted into the main housing, the first component further including a linear projection extending in a direction of the first axis, the linear projection being received in the slot of the main and clip housings and including a deflection surface that engages the abutment of the verification pull tab clip when the first component is fully inserted into the main housing to deflect the arm and allow for release of the verification pull tab clip from the clip housing.

5. The connector assembly of claim 1, further including:
a retainer clip secured to the main housing and at least partially disposed within the fluid passageway at the open first end, the retainer clip being adapted for releasably engaging and retaining a first component when inserted into the open first end.

6. The connector assembly of claim 5, wherein: (i) the main housing is monolithic in construction; (ii) the clip housing is monolithic in construction; (iii) the verification pull tab clip is monolithic in construction; or (iv) any of (i)-(iii).

7. A method for connecting and establishing fluid communication between two components, comprising:
  providing the connector assembly of claim 1;
  providing a first component including a first axis that is aligned with the first axis of the main housing when inserted into the main housing, the first component further including a linear projection extending in a direction of the first axis, the linear projection being received in the vertical slot of the main and clip housings and including a deflection surface that engages the abutment of the verification pull tab clip when the first component is fully inserted into the main housing to deflect the arm and allow for release of the verification pull tab clip from the clip housing; and
  slideably displacing the verification pull tab clip along the port and into the positive verification position by inserting an end of the first component into the open first end of the main housing until the linear projection of the first component is received in the slot of the main and clip housings and the deflection surface engages the abutment of the verification pull tab clip to deflect the arm and allow for release of the verification pull tab clip from the clip housing.

8. The method of claim 7 further comprising coupling an end of a second component to the open second end of the main housing of the connector assembly.

9. The method of claim 7, wherein: (i) the main housing is monolithic in construction; (ii) the clip housing is monolithic in construction; (iii) the verification pull tab clip is monolithic in construction; or (iv) any of (i)-(iii).

* * * * *